INVENTOR.
CHARLES E. ROGERS
BY
Ely & Frye
ATTORNEYS

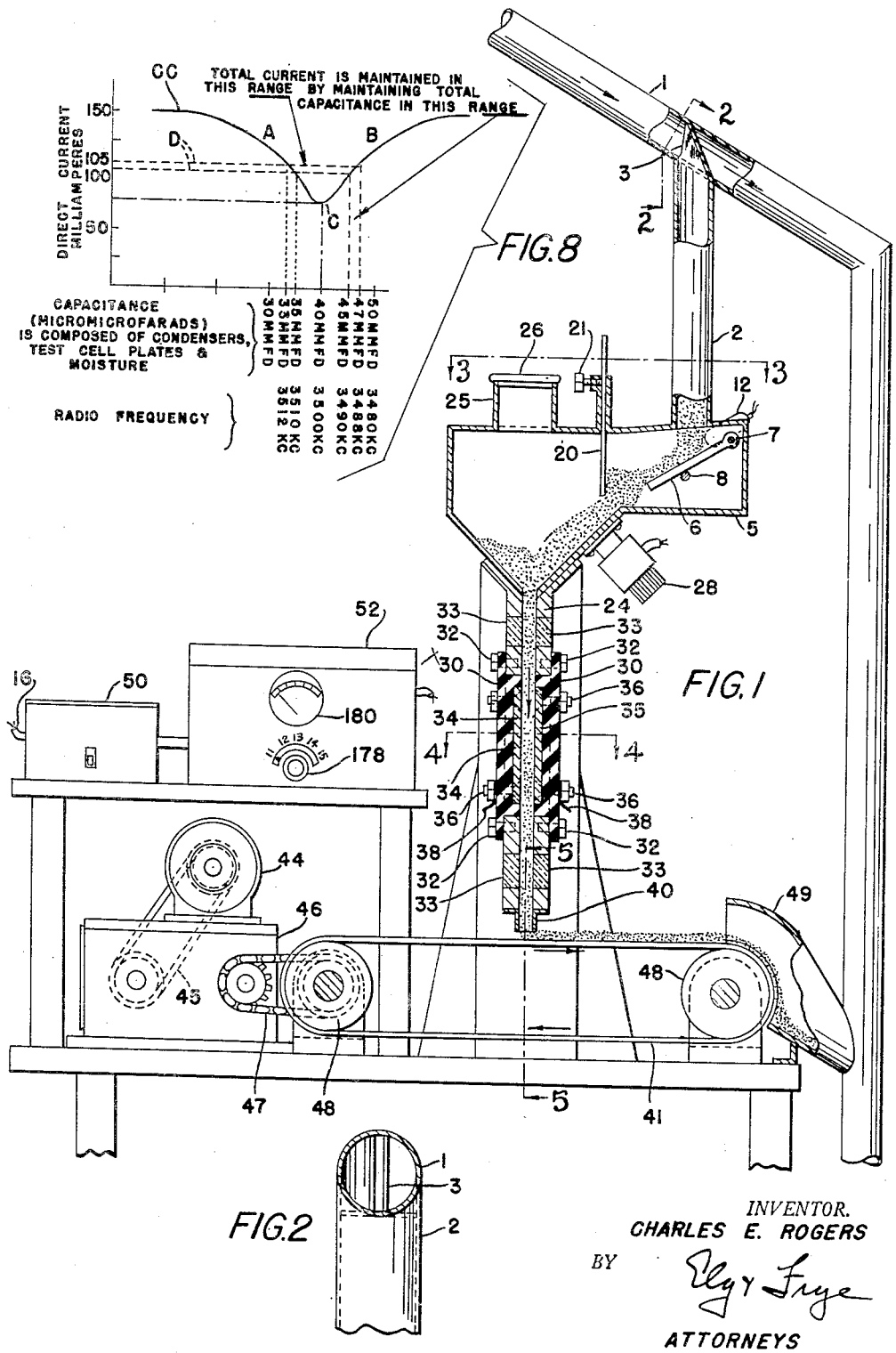

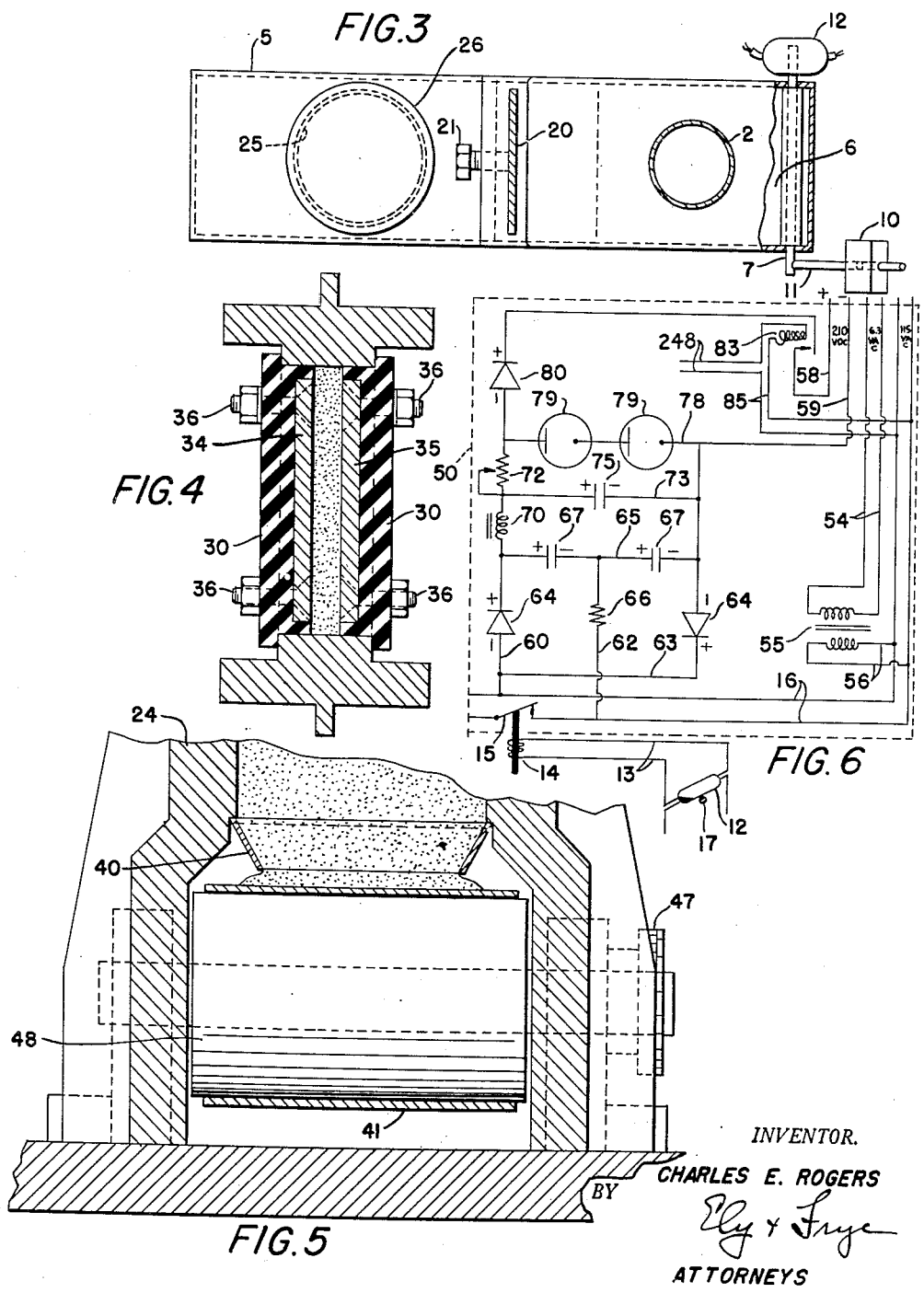

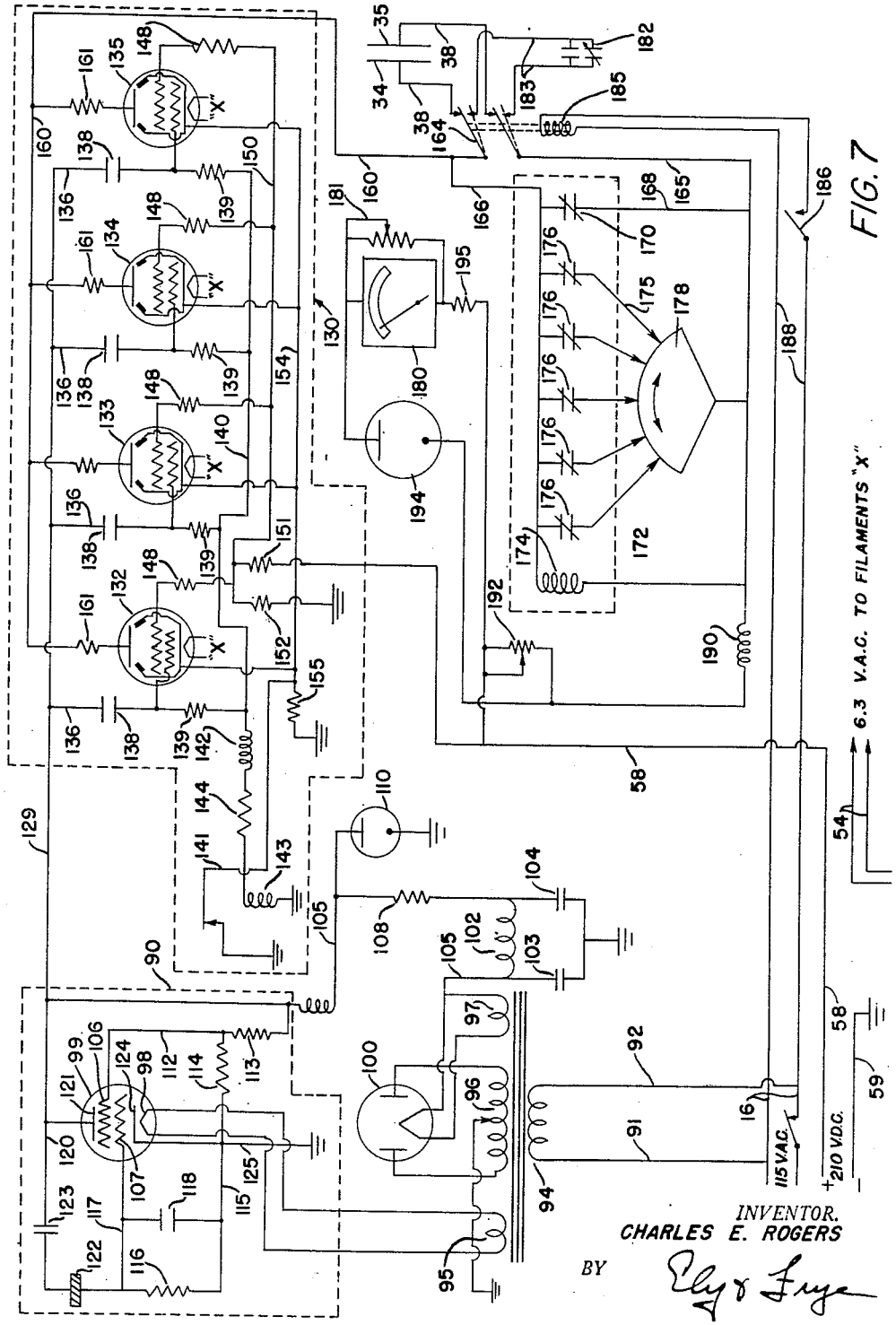

Patented Jan. 5, 1954

2,665,409

UNITED STATES PATENT OFFICE 2,665,409

METHOD AND APPARATUS FOR DETERMINING MOISTURE CONTENT OR OTHER VARIABLES IN ORGANIC MATERIALS

Charles E. Rogers, Akron, Ohio, assignor to The Quaker Oats Company, Chicago, Ill., a corporation of New Jersey Application August 30, 1950, Serial No. 182,303

27 Claims. (Cl. 324—61)

The present invention relates to improvements in methods and apparatus used for determining the moisture content of various types of organic materials. In general, it employs the method of determining the percentage of conducting constituents present in the material and, in particular, the moisture content of the material under observation by observing the variance in capacitive effect of the material when placed between two spaced electrodes across which is passed a high frequency current, preferably a current of radio frequency above three megacycles and preferably in the range of 3500 kilocycles. It has been known for some time that the percentage of moisture or similar constituent in a material placed as described has a direct effect upon the capacitance of the unit and that resonant frequency in such a current varies inversely with the capacitance of the unit. This principle of electronic measurement of moisture content or the like has been used in the determination of moisture content or the like of a large variety of materials, but previously known methods and apparatus operating upon this basic principle have had many drawbacks and objections and it is the object of the present invention to improve upon such prior art practices with a view to making the principle more efficient and more accurate.

In the prior devices operating upon the broader principle it has been the practice to measure out small batches of the material under observation and to load a measured charge between two plates in a small cell, across which the alternating current is passed. This is a time consuming operation and is generally unsatisfactory because the small batches which are tested may not truly represent the prevailing conditions of the material which is being processed.

It is also necessary, in making calculations by the old method, to make certain corrections or allowances for variations in temperature of the material. In addition to the possibility of error in making the required calculations, the temperature of the small batch may not be truly representative of the temperature of the material in process.

The method and apparatus may be used for testing a great variety of materials to determine the relative amount of conducting constituents present therein and if the particle size of the various products which may be tested is changed radically, the amount of meter deflection will vary slightly in proportion with the size of the particles. Therefore, a sensitivity adjustment has been incorporated to allow the same meter scale to be used for various products over a wide range of particle sizes.

The immediate field in which the invention has been perfected is in determining and recording the moisture content of various grains or grain products. In the general field of milling it is important that the products have certain definite moisture contents in order to preserve and store them with a minimum possible loss due to the presence of excessive quantities of moisture. This is particularly true in the cases of all types of meals, flours, and other products of a similar nature. Especially in the preparation of hominy grits, meals, or other products made from corn, the percentage of moisture content is a vital factor in the preservation of the product. The invention was perfected for determining and recording the percentage of moisture in hominy grits and corn meals. It has, however, been extended to the determination of the moisture content of other meals, flours, and the like. It will be understood that the invention is not limited to the food processing arts but may be extended to the preparation, testing, or treatment of other organic materials in which the determination of the moisture content or the like is an important or vital consideration.

The present invention departs from known methods in the arts in several important and basic features. The material which is being tested is in motion, that is to say, a portion of the material is constantly separated from a main stream thereof and is conducted through the field of the high frequency current and then returned to the main stream. This not only insures that a truly representative cross section of the material is under constant observation, but it also gives an immediate, continuous, and accurate picture of the actual condition of the product. It also avoids the time loss which necessarily is present in the old batch method, so that there are no inaccuracies due to possible variation in the moisture content that may arise in the interval. The apparatus automatically measures out a constant volume of the material under a constant head of pressure at the moment of testing, thus eliminating the weighing out of small batches by hand and also eliminating any errors which might arise from variations in the density of the sample of material under observation.

In order to eliminate the variations in readings and the necessary corrections or adjustments from a selected calibration point, due to variations in temperature, it has been found that by using an alternating current of high frequency, i. e., above three megacycles per second, variations in readings attributable to variations in temperature are either completely eliminated or become so minute as to be negligible. The process and apparatus make possible the direct reading of moisture percentages on a meter and this eliminates the need for a conversion chart to convert a meter reading into a corresponding moisture percentage. In one form of the invention the meter is associated with a range selector switch which may be adjusted by hand to change the total capacitance, as may be required, to cause the meter to register within the selected range. In a modification of the invention, the range selector switch has been eliminated and the entire range of moisture percentages appears on the meter scale. Means has been devised which at regular intervals cuts in a standard capacitance and should there be a "drift" in the capacitance, which would render the meter readings inaccurate, the device automatically adjusts a variable condenser so as to correct any error arising from variations in the capacitance. This modified form of the invention is especially valuable when the apparatus is used in connection with a recording device, which keeps a permanent record of the moisture content of the material.

It has been found that where the broad principles of determining moisture content are employed in the improved method and apparatus shown herein, it is important that the voltage input to the high frequency system be maintained more uniformly than is normally found in the customary commercial power supplies. For this reason the system includes the employment of a specially designed voltage regulator and power supply which minimizes any and all effects of input power line voltage fluctuations.

The method and apparatus also makes it possible to keep a constant observation of the moisture content or percentage of other conducting constituent of the material and obviate the unsatisfactory method heretofore employed of testing samples at intervals. This also means that the apparatus may be equipped with recording devices so that a continuous record of the material in process may be kept and observed. The recording device should be of a type, the attachment of which does not change the moisture meter circuit or its characteristics. Devices of this type are available.

The invention makes it possible to control the moisture content of the material at any desired level. This may be done by utilizing the record of the moisture content of the material passing through the test cell to control variable humidifiers and driers at some point in the plant where the material is being processed.

The apparatus is designed and equipped with a device by which the moisture determining and recording mechanism is set in operation by the flow of material and is stopped should the material cease to flow through the device.

Shown and described herein are the best known and preferred forms of the invention as it has been developed and is in actual use in the processing of food stuffs such as meal or hominy grits. It will be appreciated, however, that both the method and the apparatus may be modified or revised and improved within the scope of the invention as it is set forth in the appended claims.

In applying the invention for use with various materials, details of the invention may likewise be changed.

In the drawings:

Fig. 1 is a side view, partly in section, of a complete installation.

Fig. 2 is a section on the line 2—2 of Fig. 1.

Fig. 3 is a plan view of the grain receiving head, the view being taken on the line 3—3 of Fig. 1.

Fig. 4 is a section through the testing zone on the line 4—4 of Fig. 1.

Fig. 5 is a vertical section on the line 5—5 of Fig. 1.

Fig. 6 is a wiring diagram of a special circuit which has been devised for the purpose of securing the uniform voltage input which is desirable for the satisfactory working of the invention.

Fig. 7 is the wiring diagram of the high frequency circuit for creating the desired radio frequency across the plates of the testing unit.

Fig. 8 is a diagram showing the relationship between current, capacitance, and radio frequency which is necessary to an understanding of the working of the system.

Figure 9:
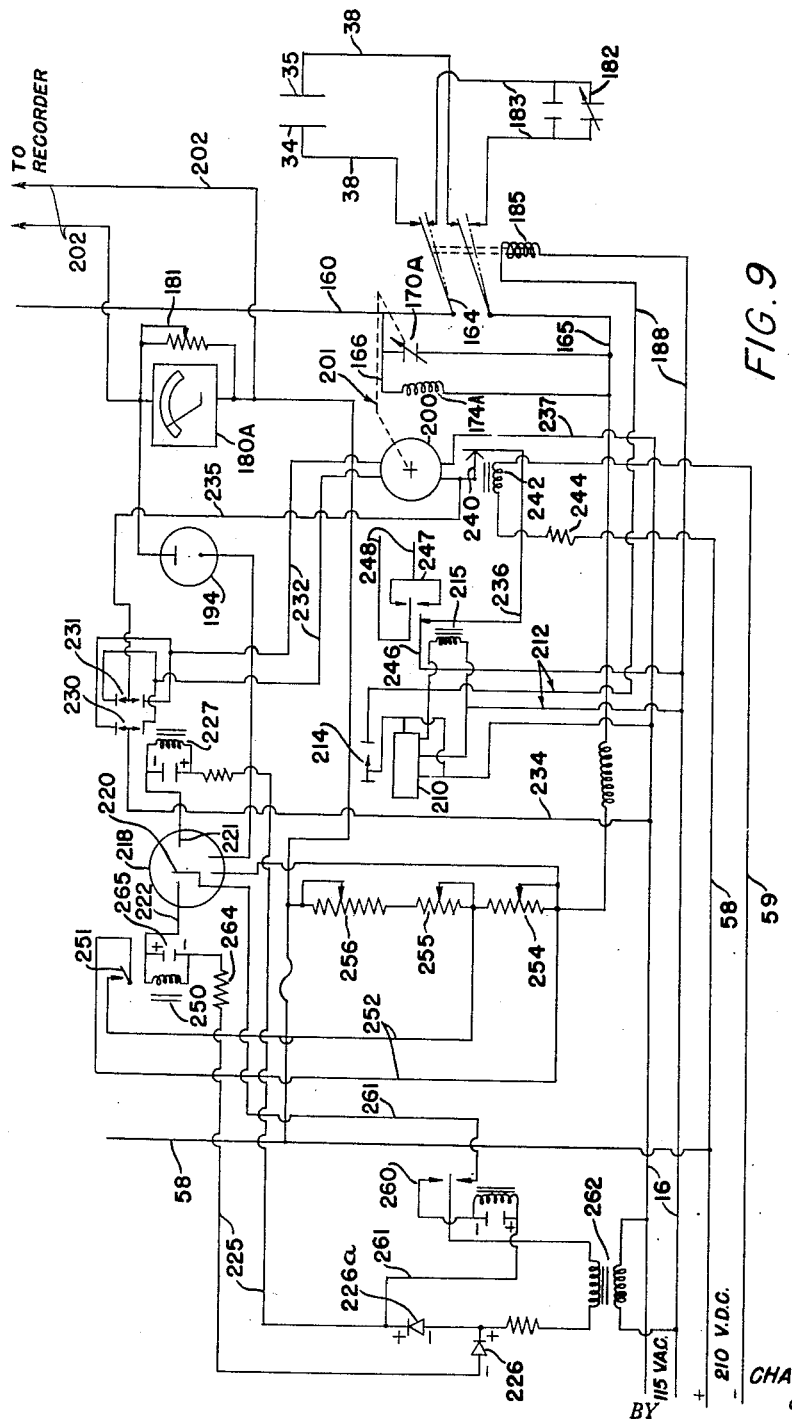
Fig. 9 is a diagram showing a modification which shows the wiring used in connection with means for automatically positioning an adjustable condenser forming a part of the total capacitance to correct any drift which has occurred in the system.

In the drawings, in which a typical installation is shown, the numeral 1 represents the main chute or conduit through which the material passes; in a representative installation this will be a chute leading from the milling room to the storage space or to weighing and bagging or packaging machines. At any suitable point in the chute there is located the entrance to a diverting chute or conduit which takes out of the stream of material a certain cross section thereof and passes it to the testing unit. The form shown consists of a second or branch chute 2, the upper end of which is reduced and flattened, as at 3, where it is set diametrically across the chute 2. In this manner, a representative cross section of the meal, flour, or other material in process is taken out of the main stream.

The material passes by gravity from the diverting chute 2 into a cabinet or box 5, where it falls on a platform 6. During the normal running of the device, the platform 6, which is secured to a rock shaft 7, stands at a downwardly inclined angle against a stop 8 so that the grain flows off the platform. The weight of the oncoming grain is counterbalanced by an adjustable weight 10 on the arm 11 extending from the rock shaft. While the grain is flowing through the system the platform 6 will lie in the position shown in Fig. 1, but when no grain is passing through the device the counterweight will raise the platform.

The upward movement of the platform caused by the cessation of flow of the material operates to shut down the operation of the moisture determining unit. For this purpose there is carried on the shaft 7 a mercury switch 12 which, when the grain is flowing, completes a circuit 13 to any suitable device, such as a solenoid 14, which closes the switch 15 in the main power line 16 (Fig. 6). When the grain ceases to flow, the solenoid is de-energized and the switch 15 will open. Any alternative device may be actuated by the mercury switch, the essential being that when no grain is passing through the machine the entire high frequency system will be shut down.

From the platform 6 the grain passes to a barrier or gate 20, at which the grain will pile up to a certain extent. The gate 20 is adjustably mounted in the top of the cabinet by a set screw 21 so that a measured stream of the grain passes beneath the gate and down the sloping hopper bottom of the cabinet to the testing chute 24. In the top of the cabinet and over the testing chute is the port 25, closed by a lid 26 which may be raised to inspect the interior of the cabinet or to permit the insertion of an instrument to break up any possible bridging of the grain in the testing chute. To prevent the material from bridging across the chute, any type of vibrating means may be employed to agitate the hopper and the chute. A standard form of vibrator operable upon a low frequency, alternating current is shown at 28, where it may be attached to the hopper or the chute.

The dimensions of the testing chute are carefully calibrated so that the cross section of the column of grain passing through the chute may be accurately maintained. As representative merely of the dimensions which may be employed in actual installations of the type particularly described herein, for use in testing grain products, the testing passage or chute is 4½ inches by $\frac{13}{32}$ of an inch, but these dimensions may be varied in accordance with the material being tested.

In the opposing side walls of the testing passages are set two panels 30 of an insulating material, which may be held in place by bolts 32 or permanently located. Set in the opposing faces of the two panels are the plates or electrodes 34 and 35 made of copper and held in position by bolts 36, one bolt on each side of the chute serving as a terminal for the lead-in wires 38. The copper plates 34 and 35 are set flush with the inner walls of the chute and are thoroughly insulated about all four sides. In the example given, these plates should be 4 inches square and the insulated chute should extend approximately 4 inches above and below the plates. Immediately above and below the electrodes are transparent sections 33 for observation of product behavior.

At the lower end of the testing chute is located a metal spout 40 of the same cross sectional area as the chute. The grain passing out of the testing passage falls on the top of a conveyer, here shown as a constant speed belt 41, which is vertically spaced from the spout 40 and kept in motion in the direction of the arrow in Fig. 1. The conveyer is driven by a motor 44 which, through belt 45, drives a variable speed reducing unit indicated by the numeral 46, which is connected by the chain 47 to one of the pulleys 48 which drives the belt.

The conveyer deposits the grain which has passed through the testing passage in a spout 49, which returns the grain to the main stream in the chute 1. In lieu of the belt, any other type of conveyer may be employed to move the material through the chute at a constant speed and at a constant head of pressure; such a conveyer might be, for example, a constantly driven cylinder located across the lower end of the chute.

The speed of rotation of the conveyer 41 and the spacing between the lower end of the discharge spout 40 and the conveyer are carefully gauged so that a constant stream of material, completely filling the cross sectional area thereof, will be maintained. This gives a constant volume of material under a constant head of pressure flowing through the passage and, consequently, the density of the material is also constant. In the actual examples, operating on such materials as meals or hominy grits, the upper surface of the conveyer passes ¼ of an inch below the lower end of the delivery spout and the speed of the conveyer is such that approximately 100 lbs. of the grain will move down through the test passage in one hour. The spacing of the conveyer and the delivery spout, and the speed of the conveyer, will be subject to variation and adjustment depending upon the character of the material being tested.

It will be particularly noted that the material being tested is not changed or damaged in any way and that it passes out of the testing unit in the same condition in which it entered the unit. The system thus presents advantages over conductance types of testing devices which, necessarily, crush the material to establish adequate electrical contact with it. The fact that the device permits such large volumes of grain to be tested also gives a more accurate picture of the condition of the material in process.

Reference is now made to the wiring diagram of Fig. 6 which shows a suitable circuit for securing the uniform voltage input to the high frequency system. Only one unit is shown, but the number of these units may be increased, depending upon the requirements of the radio frequency circuit. The power lines 16 with the make and break switch 15 has been described. In the particular installation shown and described herein, this is 115 v. A. C.

The power conversion and regulation circuit shown in Fig. 6 is housed in a cabinet 50, usually located conveniently to the testing unit. From this cabinet the lines 16 are extended directly to the radio frequency system, which is housed in a second cabinet 52, usually located at the side of the cabinet 50.

It is the purpose of the power conversion and regulator unit to deliver to the radio frequency system not only the 115 v. A. C. current through the lines 16, but also a direct current of uniform and constant voltage, preferably at 210 v., and a low voltage alternating current at approximately 6.3 v., the latter to energize the filaments in the amplifier tubes. The purpose of the uniform voltage direct current is to supply plate and screen grid voltages to the amplifier tubes of the radio frequency system. The system described is designed to deliver an adequate direct current voltage with a minimum variation regardless of changes in input voltage or changes in output current load. The output of this power supply is fixed and non-variable, although it can be designed for various desired output voltages. The usual D. C. output voltage for this equipment is 210 v. ($\pm.1$ v.) with a maximum allowable variation of output load from 0 to 250 ma. and input voltage variation from 95 to 135 v. A. C.

The low voltage alternating current passes out of the unit 50 through the lines 54, which lead from one side of the transformer 55 connected by the lines 56 extending across the main power lines 16. These lines enter the unit 52 and are connected to the filaments "X" in the four amplifier tubes shown in Fig. 7, which will be described in connection with that figure.

The 210 v. D. C. passes out of the unit 50 through the lines 58 and 59, the former being the positive line and the latter the negative. The 115 v. A. C. which enters the system is converted to a constant 210 v. D. C. by the wiring shown. From one of the lines 16 extends the line 60 and from the other line 16 extends the line 62. The line 60 has a branch line 63. The line 60 is connected to the positive line 58 through the instrumentalities to be described and the line 63 is connected to the negative line 59. In each of the lines 60 and 63 is a rectifier 64. The line 62 is connected to a line 65 through a resistor 66 which protects the rectifiers 64 and the line 65 is in turn connected to the two lines 60 and 63. In each branch of the line 65 is located an electrolytic condenser 67, these two condensers serving to step up the voltage in accordance with the output requirements. By these instrumentalities the 115 v. A. C. current is transformed to 210 v. D. C.

To insure uniform voltage there is located in the line 60, beyond its connection with the line 65, a choke coil 70 which removes any ripples and smooths out the current.

Connected directly to the line 63 and extending to an adjustable resistor 72 in the line 60 is a line 73, in which is located a condenser 75, which, used in connection with the choke coil 70, gives a pure rectified direct current.

The direct current is further controlled by a line 78 across the lines 60 and 63 and having therein two gas regulator tubes 79. A third rectifier 80 is located in the line 60. The function of this rectifier 80 is to allow the power system described to be placed in parallel with any number of similar units necessary to meet the power and current requirements of the equipment being supplied. The line 60 also passes through a 10-second time delay relay 83 which is needed to permit the tubes in the power supply and the high frequency system to warm up properly before the high voltage enters the high frequency system, the relay being connected to the lines 16 by the lines 85.

It will be seen that by the wiring system shown in Fig. 6, the standard 115 v. A. C. is converted into a higher voltage direct current of a high degree of stability and uniformity.

Referring now to Fig. 7, the radio-frequency generating devices are all housed in the cabinet 52. The circuit comprises a Pierce type radio frequency oscillator used in conjunction with a quartz crystal for the purpose of generating a radio frequency voltage of 3500 kilocycles.

This portion of the circuit is enclosed in the broken line 90. It receives power from the lines 91 and 92 connected to the 115 v. A. C. lines leading from the cabinet 50. The lines 91 and 92 lead to the power transformer 94 from which there are three take-offs numbered 95, 96 and 97, respectively. The take-off 95 conducts 6.3 v. A. C. to the filament 98 of the vacuum tube 99. The take-off 96 conducts 500 v. A. C. into the rectifier 100, which converts the high voltage alternating current to high voltage D. C. The take-off 97 introduces 5 v. A. C. to the rectifier to heat the same. The coil 102 and the two condensers 103 and 104 interposed in the line 105 leading from the rectifier tend to smooth out the current. A resistor 108, located in the line 105, reduces the voltage from 250 v. D. C. to 150 v. D. C. needed to operate the tube 110 which is the the regulator for the voltage entering the tube 99.

The tube 99 is a four element or tetrode vacuum tube, the screen grid 106 of which is connected to the line 105 by the line 112, in which is located the resistor 113. A line 115 leads from resistors 114 and 116 to the cathode line 125. The opposite end of resistor 116 is connected to the control grid 107 in the tube 99 and the quartz crystal 122.

In parallel with resistor 116 is connected a condenser 118 which, through resistor 116, tends to by-pass any alternating current flowing from the control grid to the cathode. The purpose of the resistor 116 is to develop a negative bias voltage which is impressed upon the control grid of the tube 99.

From the line 115 extends a second line 120 to the plate 121 within the tube 99 and in this line is the quartz crystal 122. Between the tube 99 and the crystal 122 is the condenser 123 which blocks direct current to prevent the same from entering the crystal. The cathode 124 of the tube 99 is grounded through the line 125. The quartz crystal 122, in conjunction with the Pierce type radio frequency oscillator described, generates a radio frequency of 3500 kilocycles, the stability of which is insured by the use of the quartz crystal as contrasted with the commonly employed "tuned tank" oscillator.

From the radio frequency generator 90, which has just been described, alternating current passes out through the line 129 to the amplifier section of the moisture meter circuit which is enclosed by the dotted lines 130. The number of amplifier tubes in the amplifier section may vary somewhat, depending upon the purpose of the circuit as to precision, range of moisture variation which may be encountered and electrical size of the components, including the power supply, all of which may be decided on the basis of cost versus the functions to be performed.

In a typical installation such as employed in the specific operations to which this invention has been primarily adapted, the amplifier unit contains four amplifier tubes of the 6Y6 type which are indicated in Fig. 7 as 132, 133, 134, and 135 and which conduct a fairly large plate current (60 ma.) with a relatively low plate voltage (125 to 135 v.). The amplifier tubes are arranged in parallel and the control grid of each is connected through a line 136 from the line 129 through a coupling condenser 138. Each line 136 is continued to line 140 through a resistor 139, usually of about 47,000 ohms, which develops negative bias voltage which is impressed on the control grids of the tubes. The line 140 is grounded through the choke coils 142 and a resistor 144.

The screen grids of the several amplifiers are connected through the resistors 148 to the line 150, which is connected through resistor 151 to the positive input line 58 which delivers the 210 v. D. C. to the amplifiers. The line 150 is also grounded through a 75,000 ohm resistor 152.

The cathodes of the several amplifier tubes are connected to the line 154 and through the resistor 155 to the ground. A safety circuit 141 designed to protect the amplifier tubes and the indicating meter consists of a relay, the winding 143 of which is in series with the amplifier grid circuit and the contact points of which are in parallel with the resistor 155. When the radio frequency oscillator 90 is supplying sufficient radio frequency voltage to the amplifier grids, a direct current will flow from the grids to the ground, which may be the chassis of the instrument. This current will energize the relay and short circuit the cathode resistor through the line 141, allowing normal operation of the amplifiers. However, if the radio frequency oscillator fails to supply a sufficient voltage to the amplifier grids, no current will flow through the relay, the cathode resistor will remain in the circuit and no large amount of current can flow through the amplifiers.

The anode plates of the several amplifier tubes are connected to the line 160 through resistors 161 which equalize or spread the current evenly to the several tubes.

The line 160 is connected through one arm of the switch 164 to the line 38 leading to one of the plates of the testing unit, here, the plate 34. The opposing plate 35 is connected through its line 38 and through the other arm of the switch 164 to the line 165.

In the plate circuit of the amplifier tubes is a resonant tuned circuit network, made up of inductance and capacitance elements of which the copper plates 34—35 in the test cells form a part of the total capacitance. The remainder of capacitive elements consists of adjustable trimmer condensers. That part of the radio network, aside from the plates 34—35, is located in the section indicated by the dotted line 172. These elements are in parallel with the test plates 34—35 and through the line 166 which connects with the line 165 after passing through the coil 174, which constitutes the inductance element. The capacitance elements in this portion of the network consist of an adjustable condenser 170 located in the line 168 extending across the lines 165—166 and the so-called trimmer condensers 176.

The function of the condenser 170 is to determine the part of the capacitance-current curve in which the equipment will operate. The other adjustable condensers, here shown as five in number and bearing the reference numerals 176, are located in lines 175 extending to a shorting type switch 178 which is connected to the line 165. The connections for the condensers 176 are at successive points on this swtich 178 so that they can be added to or subtracted from the circuit as needed to maintain the plate current within the desired section of the capacitance current curve.

To understand the operation of the method and the apparatus it is necessary to understand the development of the capacitance curve as the capacitance varies above and below the quartz crystal radio frequency point. Reference is made to Fig. 8 for a further understanding, it being noted that the values shown in this diagram are for purposes of illustration only.

In Fig. 8, the capacitance-current curve is indicated by the line CC. On the left hand or A side of this curve an increase in the capacitance (mmfd.) causes a decrease in the direct current (milliamperes) and on the right hand or B side of the curve CC an increase in capacitance causes an increase in current. At the point C, the maximum resistance in the amplifier tubes causes the minimum current. In carrying out the purposes of the invention the total current is maintained in the range between the dotted lines D—D by maintaining the total capacitance in this range. The curve between these two lines is the steepest and hence the variations are most pronounced. It will be understood that the capacitance is composed of the several condensers which have been described in connection with the section 172 of the radio network and the test cell plates 34—35 and the moisture content of the material which is located between the plates 34 and 35. When no material whatever is passing between the plates 34—35 to keep the capacitance above the mid point C on the curve C—C the mechanism is inoperative. It will also be noted from Fig. 8 that the resonant frequency varies inversely with the capacitance.

When the inductance and capacitance values are of a certain combination in the amplifier circuit they will resonate or be in tune with the radio frequency voltage being supplied to the amplifiers, which, in the case selected, is 3500 kilocycles. When this combination produces a perfectly resonant circuit, the internal resistance of the amplifier tubes 132—135 reaches a maximum value and hence with a fixed D. C. plate voltage the plate current reaches a minimum. Hence the plate voltage must be maintained with as little variation as possible, which is accomplished by the circuits shown and described in reference to Fig. 6.

Any change in capacitance or inductance from this combination of values will produce a decrease in the internal resistance of the amplifier tubes and hence an increase in the plate current. It will be understood that when the device is operating, the only variable in capacitance is caused by variations in the percentage of the conducting constituent of the material or in the specific case the moisture content of the grain which is passing through the test unit and between the plates 34—35.

It is therefore desirable to select such values of inductance and capacitance in the system which includes the effect of the moisture content of the grain so as to place the circuit in operation on a section of the current capacitance curve C—C between the lines D—D, which is approximately midway between the maximum and minimum plate currents.

Because of the dipole moment of water, any increase in the amount of water in the material between the plates 34—35 will have the effect of increasing the capacitance of the test unit, which is, as noted, one of the capacitance elements in the radio network.

Hence, if the inductance-capacitance combination is determined by the adjustable condenser 170, to bring the inductance-capacitance toward the high capacitance side of the current-capacitance curve, the system will be on the section of the curve where any increase in capacitance will produce an increase in amplifier plate current and any decrease in capacitance will produce a decrease in amplifier plate current. In such a case the system is operating on the right hand side of the curve as shown in Fig. 8. This is preferred; however, it is possible to carry out the invention by operating upon the left hand side of the curve in which case the relation of capacitance and plate current will be reversed.

As noted above, when the system is set for testing the moisture content of materials and in normal operation, due to the dipole moment of water, the only variable will be the variable in capacitance due to increase or decrease in the degree of moisture in the material. From this it will be seen that in the selected embodiment of the invention, any increase in the amount of moisture in the material being tested or under observation as it passes between the plates 34—35 will produce an increase in amplifier plate current and any decrease in the amount of moisture will produce a decrease in amplifier plate current.

Understanding the system which has been developed, it will readily be seen that variations in the milliamperes of the direct current in the amplifiers accurately measure the variations in moisture content of the material and these variations may be reflected and shown on a milliammeter. Such a milliammeter is indicated at 180. It may be a simple needle moving over the face of a dial or it may be of the recording type in which the fluctuations of plate current are recorded on a moving paper. Either type of meter or register is well known and by illustrating the simple dial type it is intended to include both the visual and recording types of meters. Associated with the meter and shown at 181 is a sensitivity adjustment for causing the meter to correctly indicate the moisture content of various materials of different particle sizes.

The initial setting of the system is done through the condenser 170, as described, with the remaining condensers at the desired adjustment through any desired setting of the shorting switch 178. If the amount of the moisture is such that the inductance-capacitance combination might be moved out of the predetermined and preselected section of the current-capacitance curve C—C, the trimmer capacitors represented by the condensers 176 should be added or subtracted by means of the selector shorting switch 178, as indicated on the dial shown in Fig. 1, to keep the operation of the system within the desired range of plate current. As shown and described in connection with the modification of Fig. 9, the trimmer capacitors are eliminated and the apparatus is constructed so that the entire range of moisture content is measured and recorded without manually adjusting the capacitance.

In the processing of corn products, such as hominy grits, it is desirable to maintain the moisture content at or very close to 14%, depending, to a certain extent, on the season. In processing corn products, therefore, the initial setting of the system is such that the measurements will be taken in the zone D—D on the capacitance curve. In the processing or observation of other products or materials, the setting will be varied, it being the desideratum that the milliammeter function in that range.

It is highly desirable to detect any possible "drift" or shift from the originally selected portion of the current capacitance curve C—C. In conventional machines such as "drift" can be caused by a shift in the operating frequency as well as by shifts in values of inductances and capacitances in the amplifying section. In the system which has been described herein, frequency cannot shift because it is determined by the quartz crystal 122, whereas, in conventional machines, the radio frequency is determined by a "tuned tank" circuit. In the present invention the only possible cause of shift in the current-capacitance curve would be in a change in the value of some element in the amplifier section, usually due to thermal effects. Such a shift may occur during the warming up period and hence could be readily understood and accounted for, but it is desirable to detect "drift" at any time, regardless of the cause.

Also, in the conventional types of electronic moisture meters, it is necessary that the cell be empty when checking for possible drift. Because, in the preferred embodiment of the invention, the measurements are taken on a constantly moving stream, it is impractical or inconvenient to shut down the equipment for testing, but desirable to test the equipment while the material is flowing through the test unit.

The invention, therefore, contemplates the provision of a standard capacitor of known value equivalent to the material being tested and to by-pass the test cell and substitute in the system such a capacitor element. Hence, by observing the behavior of the milliammeter when the standard capacitor is cut into the system in lieu of the test unit, the checking process is done without interrupting the flow of material through the test unit.

For example, in the case of corn products where, as noted above, the desirable moisture content is 14%, the standard capacitor to be cut into the system is one which has the same capacitive effect as the corn product with that moisture content.

Such a standard or pilot capacitor is shown in Fig. 7 at 182, comprises a fixed condenser and an adjustable condenser, so that the capacitor may be set for various materials. This capacitor is located in the circuit 183, the terminals of which are located in the path of the switch 164. In the condition shown in Fig. 7, the test unit is connected to and a part of the system, as shown by the full line position of the switch 164. If, however, the switch 164 is moved to the dotted line position in contact with the line 183, the test unit will be out of the system and the pilot or standard capacitor 182 will take its place.

It is preferred to make any such shift by connecting the switch 164 to the core of a solenoid 185, which is energized when a switch 186 is closed in an extension 188 of the lines 16.

If, when the switch 164 is thrown to cut in the capacitor 182, the meter reading indicates a shift from the correct combination of inductance and capacitance, such a shift is counteracted and normal conditions are restored by an adjustment of the capacitor 170 which is in the balance of the system and normally in parallel with the plates 34—35.

It is not desirable to read the total plate current as an indication of the moisture content of the material under observation because the total amplifier plate current will never become zero and also because the variations in total plate current caused by moisture variations will be a small part of the total current. It is necessary and desirable, therefore, to use a device which will select a small portion of the current-capacitance curve and magnify that small segment so that it will spread across the full range of the register or meter 180. This is done by the instrumentalities shown in Fig. 7, as associated with the milliammeter 180.

Beyond the connections for the inductance and trimmer condensers there is located the radio frequency choke coil 190, which permits only direct current to pass to the milliammeter circuit. In this circuit is located a voltage dropping resistor 192 (approx. 700 ohms), a gas type voltage regulator tube 194, a stabilizing resistor 195 of approximately 200 ohms, and the milliammeter 180 having a full scale reading of not more than 10 milliamperes.

The current acts in the following manner: The gas tube 194 will not allow any current to pass through it and through the milliammeter until the voltage drop across the resistor 192 exceeds the voltage drop of the gas regulator tube. Depending upon the value of the dropping resistor, the total plate current will usually exceed 100 ma. before the tube 194 and the meter 180 start to conduct current.

After the tube 194 starts to conduct current it will take nearly 100% of any increase in current due to the property of this type of tube, which causes it to maintain a constant voltage drop regardless of the amount of current being conducted. The voltage drop across the resistor 192 can never exceed the rated voltage drop of the tube 194 which is in parallel with it.

The function of the resistor 195 is to minimize fluctuation in current flowing through the tube 194, with which it is in series.

It will be seen from the above description of the meter circuit that any change in the moisture content of the material passing between plates 34—35 will be reflected nearly 100% on the milliammeter 180. It will also be noted that the circuit develops a change in current flow of approximately 300 microamperes for every $\frac{1}{10}$ of a percent change in the moisture content, whereas, in conventional types, the current change for a $\frac{1}{10}$ of a percent moisture is only about 1 or 2 microamperes. This development of heavier current enables the machine to use a relatively heavier indicating meter with heavier current throughout, tending to promote greater stability.

In the embodiment of the invention shown in Fig. 7, the standard condenser 182 is substituted for the test plates 34—35 at such intervals as may be considered advisable for detecting any "drift" in the capacitance of the radio frequency system. Also there are provided a plurality of variable condensers 176 which are placed in the system by the switch 178, which constitutes a range selector.

In the form of the invention shown in Fig. 7, the system is so arranged that at stated intervals the standard condenser is cut into the radio frequency system and should there have been any "drift" in the system, a single variable condenser is actuated so as to correct it. This modification of the invention eliminates the range selector 178 and the condensers 176, and also renders the system more adaptable for use with a recording device, which keeps a permanent record of the content of conducting constituent in the material located between the plates 34—35.

Referring to Fig. 9, which shows only that portion of the complete radio frequency system which is modified to carry out the purposes set forth, it will be seen that the plates 34—35 are located as in Fig. 7, as is also the standard condenser 182 which is set for the standard or predetermined moisture content of the material located between the plates 34—35. The cut-in switch 164 is the same as in Fig. 7 together with the solenoid 185 which operates it when the solenoid is energized through the lines 188, but the manually operated switch 186 is omitted. The adjustable condenser 170 is replaced by a condenser 170A which, in the modified form of the invention, is operated by a reversible motor 200, which changes the setting of the condenser in accordance with the capacitance requirements of the system and this takes the place of the condenser 170 and the several condensers 176 of the range selector. The connection between the motor 200 and the condenser 170A is indicated by the dotted line 201. This is in the neighborhood of a 1000 to 1 reduction, so that the condenser moves over quite a small arc during any one operation of the motor. The inductance 174A is the equivalent of the inductance 174 in Fig. 7. The milliammeter 180A, which is substituted for the milliammeter 180 has a wider range, sufficient to cover the complete range of readings which were taken care of in Fig. 7 by the meter 180 and range selector 178. In Fig. 9 wires 202 are shown which lead to any suitable recording instrument by which the variations of the needle are made a permanent record.

Where other elements shown in Fig. 9 are the same or the equivalents of those shown in Fig. 7, they bear the same reference numerals.

In the system shown in Fig. 9 there is a timer indicated by the numeral 210. This timer runs constantly and is set so that at stated intervals and for predetermined periods the standard condenser 182 will be cut into the system and the necessary corrections made at the adjustable condense 170A to compensate for any drift. In actual practice, the timer has been set to operate the control mechanism at 15 minute intervals and for periods of 30 seconds, but the intervals and the periods may be varied in accordance with the requirements of the whole system. The timer closes the circuit 188 through the lines 212 so that the solenoid 185 is energized at the selected time. If for any reason checking of the system should be required before or between the operations of the timer, a manually operated switch 214 is provided which closes the circuit to the solenoid 185 independently of the timer.

The timer also energizes the relay 215 which controls the flow of current to the motor 200.

Located in the system in series with tube 194 and with the milliammeter 180A is a second milliammeter 218. If, when the standard capacitor 182 is cut into the system by the operation of the timer (or the hand switch 214), a variation has occurred in the circuit such as might be caused by a shift in the variable condenser 170A, the readings on the meters 218 and 180A will not agree with the preselected setting of capacitor 182. The movable needle of milliammeter 218 is indicated at 220, which travels between the two contact points 221 and 222. If, when the condenser 182 is cut into the system the capacitance 170A is too low, the points 220 and 221 will not make contact and by the mechanism to be described the motor 200 will operate to tune in the condenser 170A until the current passing through the milliammeter 218 and 180A is sufficient to close the contacts 220 and 221, whereupon the motor is reversed and the cycle repeats.

Numerals 230 and 231 represent spring elevated contacts which, when raised, complete the circuit to the motor in forward direction. When the contacts 230 and 231 are lowered, the motor is reversed. The closing of the contacts 220 and 221 closes the circuit constituted by the lines 225 which receives current from the 115 v. A. C. current lines 16, which is converted to D. C. by the rectifiers 226 and 226a after passing through transformer 262. The current thus transmitted energizes the coil 227, which pulls down spring held contacts 230 and 231, which closes the circuit 232 and reverses the motor.

It will thus be seen that at each interval the timer cuts the standard capacitance 182 into the system, any drift in the capacitance will be reflected at the meter 218. If the capacitance represented by the condenser 170A and the other parts of the system is too low, the points 220 and 221 will not contact and the motor 200 will be driven forwardly, adjusting the condenser 170A to increase its capacitance. When the condenser 170A has been brought to the point where the capacitance is correct, the needle 220 will move to the right and the contact of the points 220 and 221 will reverse the motor until equilibrium is restored. If, when the condenser 182 is cut in, the capacitance in the system is too high, the points 220 and 221 will contact and the motor will be reversed, restoring the equilibrium in the system.

The shiftable contact 230 is connected by the line 234 with one line 16, while the contact 231 is connected to the other line 16 by the line 235 through the return line 236 from the motor 200. The motor 200 is connected to the other line 16 by the extension 237.

Should the voltage in the power lines 58—59 drop appreciably below 210 v., the readings on the milliammeters 218 and 180A will be incorrect and the needles will swing to the left, giving an incorrect reading. It is therefore desirable to provide for interrupting the operation of the motor 200 should such a condition arise. There is, therefore, provided in one of the lines to the motor (here shown as 236) an emergency switch 240 which is normally closed by the relay 242 which is located in the lines 58 and 59. This is usually a standard 110 v. relay, the voltage being reduced to that value by a resistor 244. The relay 242 is provided as an insurance that the motor 200 will not operate should there be a substantial drop in the voltage in the lines 58—59, which, as noted in connection with Fig. 7, supplies the direct current to the amplifiers in the radio frequency system. As a further precaution there is also located in the line 236 a second switch 246, which is actuated by the timer 210. The interrupter contacts 247 connected to the power supply shown in Fig. 6 break the circuit to the time delay relay 83 which serves to guarantee that the regulator tubes 78 and 79 in the power supply are conducting.

Upon starting up the system or when the moisture content of the material in the test cell formed by plates 34—35 is very low, the voltage may be so low that it will not pass the tube 194. When insufficient capacitance is developed by the material in the test cell no direct current will flow through the meter 218 and the needle 220 will swing to the left and make contact with the line 222. When contact is made the relay 250 will be energized, which will cause the contact at 251 to open. This contact 251 is normally closed and, through the circuit 252, short circuits the resistor 254. It will be seen that when the contact 251 is open, the resistor 254 and the resistors 255 and 256 and the combination of these three elements which are in the line 165 leading from the test cells 34—35 to the meter 180A will develop enough voltage across the tube 194 to start it conducting, which will in turn conduct sufficient current to the meters to cause the needle 220 to assume its normal position.

To prevent the needle 220 from fusing on either contact point 221 or 222, a vibrator relay 260 is located in the line 261 leading to the milliammeter 218 from one of the lines 225. The vibrator 260 is supplied with pulsating direct current from the lines 16 through the transformer 262, which supplies the current to the rectifiers 226 and 226a for the lines 225. The action of the vibrator 260 is to provide a constant interruption in the current to the meter 218, and this prevents the needle 220 from welding to the points 221 or 222.

It will be seen that the transformer 262 not only furnishes the necessary supply of alternating current which is converted into direct current by the rectifiers 226 and 226a, and the pulsating direct current for the vibrator 260, but it also serves to isolate the meter 218 and its associated relays, etc., from the rest of the system. The resistor 264 serves to protect the points in the meter 218 at the instant of contact, and with this resistor is associated a condenser 265.

It will be evident from the foregoing description of the method and apparatus that the advantages over the older methods are substantial and that the results are more accurate and enable the processor of the material under observation to control the moisture content thereof most efficiently.

While the invention is primarily designed and adapted for measuring the moisture content of a fluent material while it is in motion in a stream of constant volume and under a constant head of pressure, certain aspects of the invention may be adaptable for measuring the moisture content of material not in motion. It is also possible to pass the whole of a stream of fluent material between the plates 34—35 rather than a portion of the stream.

It will be appreciated that while the description of the method and apparatus have been quite detailed, variations and modifications thereof, other than those specifically suggested, may be resorted to without affecting the invention as expressed in the appended claims.

What is claimed is:

1. The method of measuring the percentage of conducting material contained in a fluent material while in a confined stream of constant volume and under a constant pressure head comprising the steps of passing said stream of material between the plates of a condenser, said condenser together with the material located therein constituting a part of the total capacitance of a high frequency system, the balance of the capacitance in said system being of a value to create a total capacitance within a selected, intermediate portion of the current-capacitance curve, and measuring the variations in capacitance caused by variations in the percentage of conducting constituent in the material between the plates.

2. The method of measuring the percentage of conducting material contained in a fluent material while in a confined stream of constant volume and under a constant pressure head comprising the steps of passing said stream of material between the plates of a condenser, said condenser together with the material located therein constituting a part of the total capacitance of a high frequency system, the balance of the capacitance in said system being of a value to create a total capacitance within a selected, intermediate portion of the current-capacitance curve, measuring the variations in capacitance caused by variations in the percentage of conducting constituent in the material between the plates, and adding to or subtracting from the balance of the capacitance to compensate for major variations of said percentage so that the measurements are taken in the said selected intermediate portion of the current-capacitance curve.

3. Means for testing fluent material in motion comprising a chute, means for supplying a body of the material at the upper end of the chute sufficient to fill the chute, a conveyer across the lower end of the chute to receive the material as it passes out of the chute, means to drive the conveyer at a constant predetermined speed, a pair of condenser plates in opposite sides of the chute, a radio frequency system, said plates and the material passing between them forming a portion of the capacitance of said system, and means for determining fluctuations in the capacitance of said system caused by variations in the conductivity of the material.

4. Apparatus for testing fluent material in motion comprising a main conduit through which the material flows, a smaller and secondary conduit the mouth of which is located in the main conduit, a testing chute, means between the secondary conduit and the testing chute to supply a sufficient amount of the material to the testing chute to cause it to fill the testing chute with a constant volume of the material, a conveyer at the discharge end of the testing chute, means to operate the conveyer at a constant speed to maintain the material in the chute at a constant pressure head, condenser plates in the testing chute between which the material passes, and a radio frequency system comprising the condenser plates, and means to measure the capacitance of the condenser plates and the material between the condenser plates.

5. Apparatus in accordance with claim 4 in which the test cell is provided with a vibrator which agitates the material in the test cell.

6. Apparatus for measuring the moisture content of material, comprising two condenser plates, means for passing a stream of the material between the condenser plates, a radio frequency system including a quartz crystal controlled Pierce-type oscillator, the condenser plates constituting a part of the capacitance of the system, an adjustable capacitance forming another part of the capacitance, means for automatically adjusting the last named capacitance so as to bring the total capacitance within a selected intermediate zone on the current capacitance curve of the system, amplifier tubes in the system, and means for measuring the fluctuations in the direct plate current which are created by variations in the moisture content of the material between the condenser plates.

7. Apparatus for measuring the moisture content of material, comprising two condenser plates, means for passing a stream of the material between the condenser plates, a radio frequency system, the condenser plates constituting a part of the capacitance of the system, an adjustable capacitance forming another part of the capacitance, means for automatically adjusting the last named capacitance so as to bring the total capacitance within a selected intermediate zone on the current capacitance curve of the system, amplifier tubes in the system, means for measuring the fluctuations in the direct plate current which are created by variations in the moisture content of the material between the condenser plates, a pilot condenser of known capacitance, and means for automatically substituting the said pilot condenser for the condenser plates in the system for operating the capacitance adjusting means.

8. Apparatus for measuring the moisture content of material in motion comprising two condenser plates, means for passing the material between the condenser plates, a radio frequency system, the condenser plates constituting a part of the total capacitance of the system, an adjustable capacitance forming another part of the total capacitance, means for measuring the fluctuations in capacitance of the system caused by the moisture content of the material, a pilot condenser of known capacitance, a timer in the system and means operated by the timer at predetermined intervals for substituting the said pilot condenser in the system in lieu of the said condenser plates for adjusting said adjustable capacitance in either direction.

9. Apparatus for measuring the moisture content of material in motion comprising two condenser plates, means for passing the material between the condenser plates, a radio frequency system, the condenser plates constituting a part of the total capacitance of the system, adjustable capacitance forming another part of the total capacitance, means for measuring the fluctuations in capacitance of the system caused by variations in the moisture content of the material, a timer in the system and means operated by the timer at predetermined intervals for checking and rectifying the total capacitance of the system without interfering with the movement of the material between the plates.

10. Apparatus for determining the percentage of conducting constituents present in a fluent material, means for forming a confined stream of said material of constant volume and density, stationary condenser plates and means for conducting said stream at uniform speed and constant volume and density between the condenser plates, a high frequency system, said condenser plates and the material between them constituting a part of the total capacitance of the system, an adjustable capacitance forming another part of the total capacitance, means for adjusting the last named capacitance so as to bring the total capacitance within a selected intermediate zone on the current-capacitance curve of the system, and means for measuring the variations in capacitance due to variations in the percentage of conducting constituents.

11. Apparatus for determining the percentage of conducting constituents present in a fluent material, means for forming a confined stream of said material of constant volume and density, stationary condenser plates and means for conducting said stream at uniform speed and constant volume and density between the condenser plates, a high frequency system, said condenser plates and the material between them constituting a part of the total capacitance of the system, an adjustable capacitance forming another part of the total capacitance, means for adjusting the last named capacitance so as to bring the total capacitance within a selected intermediate zone on the current-capacitance curve of the system, amplifier tubes in the system, and means for measuring fluctuations in the direct plate current which are created by variations in the percentage of conducting constituents.

12. Apparatus for the uses and purposes set forth comprising a confined testing chute, means for passing material to be tested to determine the percentage of conducting material therein in a stream of constant speed and density through the chute, opposed plates in the chute constituting a condenser, a high frequency system, said plates together with the material therebetween constituting a part of the total capacitance of said system, adjustable condensers comprising the balance of the capacitance of said system, the total capacitance being adjustable to bring it in a selected intermediate zone of the current-capacitance curve of the system, amplifier tubes in the system, means for supplying direct current of constant voltage to the amplifier tubes, and an ammeter in a selective circuit in the system to measure the fluctuations within the said zone of the current-capacitance curve in plate current in the amplifier tubes due to variations in the capacitance of the element formed by the said plates and the material.

13. Apparatus for the uses and purposes set forth comprising a confined testing chute, means for passing material to be tested to determine the percentage of conducting material therein in a stream of constant speed and density through the chute, opposed plates in the chute constituting a condenser, a high frequency system, said plates together with the material therebetween constituting a part of the total capacitance of said system, adjustable condensers comprising the balance of the capacitance of said system, the total capacitance being adjustable to bring it in a selected intermediate zone of the current capacitance curve of the system, amplifier tubes in the system, means for supplying direct current of constant voltage to the amplifier tubes, an ammeter and an ammeter circuit in the system, and means in the ammeter circuit to cause the fluctuations in plate current in the amplifier tubes to be transmitted to the ammeter within the selected zone of the current-capacitance curve.

14. Apparatus for the uses and purposes set forth comprising a confined testing chute, means for passing material to be tested to determine the percentage of conducting material therein in a stream of constant speed and density through the chute, opposed plates in the chute constituting a condenser, a high frequency system, said plates together with the material therebetween constituting a part of the total capacitance of said system, adjustable condensers comprising the balance of the capacitance of said system, the total capacitance being automatically adjustable to bring it in a selected intermediate zone of the current-capacitance curve of the system, amplifier tubes in the system, means for supplying direct current of constant voltage to the amplifier tubes, an ammeter in the system to measure the fluctuations in plate current in the amplifier tubes due to variations in the capacitance of the element formed by the said plates and the material, a timer, means actuated by the timer for checking the total capacitance of the system without interfering with the flow of the material between the plates, and power operated means to adjust the condenser in response to the checking means.

15. Apparatus for measuring the percentage of conducting constituents present in a material, said apparatus comprising two condenser plates between which the material is introduced, said condenser plates constituting a part of the capacitance of a high frequency system, an adjustable condenser forming another part of the capacitance of the system, a pilot condenser of predetermined capacitance, power means for periodically substituting the pilot condenser for the said two condenser plates, and power means operative while the pilot condenser is a part of the system for actuating the said adjustable condenser to correct any drift in the capacitance of the system.

16. Apparatus for determining the percentage of conducting constituents present in a material, said apparatus comprising a test cell for the material comprising two condenser plates which with the material constitute a part of the total capacitance of a high frequency system, an adjustable condenser constituting another part of the capacitance, a reversible motor to actuate the adjustable condenser to vary its capacitance, a standard condenser, means to substitute the standard condenser for the test cell in the system, and means to operate the motor while the standard condenser is in the system to correct any change in the capacitance of that portion of the system excluding the test cell.

17. Apparatus for determining the percentage of conducting constituent present in a material, said apparatus comprising a test cell for the material comprising a condenser which with the material in the condenser constitutes a part of the total capacitance of a high frequency system, an adjustable condenser constituting another part of the capacitance, a reversible motor to actuate the adjustable condenser to vary its capacitance, a standard condenser, means to substitute the standard condenser for the test cell in the system, a meter relay in the system, and means controlled by the meter relay while the standard condenser is in the system for causing the motor to move the adjustable condenser to correct any drift in the capacitance of the system exclusive of the test cell.

18. Apparatus for determining the percentage of conducting constituent present in a material, said apparatus comprising a test cell for the material comprising a condenser which with the material in the condenser constitutes a part of the total capacitance of a high frequency system, an adjustable condenser constituting another part of the capacitance, a reversible motor to actuate the adjustable condenser to vary its capacitance, a standard condenser, a timer operative at predetermined intervals to substitute the standard condenser for the test cell in the system, a meter relay in the system, and means controlled by the meter relay while the standard condenser is in the system for causing the motor to move the adjustable condenser to correct any drift in the capacitance of the system exclusive of the test cell.

19. Apparatus for determining the percentage of conducting constituent present in a material, said apparatus comprising a test cell for the material comprising a condenser which constitutes a part of the total capacitance of a high frequency system, an adjustable condenser constituting another part of the capacitance, power operated means to actuate the adjustable condenser, a standard condenser of fixed capacitance, means operable at timed intervals to substitute the standard condenser for the test cell in the system, and means actuated by the occurrence of any drift in the capacitance to actuate the power operated means to vary the capacitance of the adjustable condenser while the standard condenser is in the system.

20. Apparatus for measuring the moisture content of material in motion comprising two condenser plates, means for passing the material between the condenser plates, a radio frequency system, the condenser plates and the material between them constituting a part of the total capacitance of the system, adjustable capacitance forming another part of the total capacitance, means for measuring the fluctuations in capacitance of the system caused by variations in the moisture content of the material, a timer, a standard condenser, said condenser being introduced into the system by the timer at timed intervals for checking the capacitance of the system exclusive of said two condenser plates without interfering with the movement of the material between the plates, and means for automatically adjusting said last named capacitance to correct any drift occurring therein.

21. The method of testing the moisture content of a stream of material comprising diverting from the main stream of the material a portion constituting a true cross section thereof to form a second stream, passing said second stream at a uniform speed, at a constant volume and under a constant head of pressure between the plates of a condenser, and measuring the variations in dielectric constant of the material at radio frequencies sufficiently high to substantially eliminate variations due to temperature.

22. The method of testing the moisture content of a stream of material comprising diverting from the main stream of the material a portion constituting a true cross section thereof to form a second stream, passing said second stream at a uniform speed, at a constant volume and under a constant head of pressure between the plates of a condenser, and measuring the variations in dielectric constant of the material at radio frequencies above three megacycles to substantially eliminate variations due to temperature.

23. The method of testing the moisture content of a stream of material comprising diverting from the main stream of the material a portion constituting a true cross section thereof to form a second stream, passing said second stream at a uniform speed, at a constant volume and under a constant head of pressure between the plates of a condenser, and measuring the variations in dielectric constant of the material within a limited intermediate segment of the current capacitance curve, at radio frequencies sufficiently high to substantially eliminate variations due to temperature.

24. The method of testing the moisture content of a stream of material comprising diverting from the main stream of the material a portion constituting a true cross section thereof to form a second stream, passing said second stream at a uniform speed, at a constant volume and under a constant head of pressure between the plates of a condenser, measuring the variations in dielectric constant of the material within a limited intermediate segment of the current capacitance curve, at radio frequencies sufficiently high to substantially eliminate variations due to temperature, and magnifying said limited segment electrically so as to expand the visual effect of said measurement.

25. The method of measuring directly on a meter the moisture content of a fluent material while in motion in a confined stream of constant volume and under a constant head of pressure, comprising passing the stream between the plates of a condenser, measuring within a selected intermediate segment of the current capacitance curve the variations in dielectric constant of the material passing between the condenser plates caused by variations in the moisture content of the material, and maintaining a predetermined capacitance in circuit with the condenser by increasing or decreasing said capacitance to compensate for greater variations in the moisture content of the material, so that the measurements read on the meter from maximum to minimum dial limits while covering the entire selected intermediate segment.

26. Apparatus for measuring the moisture content of a fluent material comprising a pair of spaced plates, a tuned radio frequency system of which said spaced plates form a portion of the total capacitance, means for conducting a main stream of said material past the plates, means for diverting a secondary stream from the main stream and passing said secondary stream in constant volume and under a constant pressure head between said plates, circuit means in said system for maintaining the total capacitance in a selected intermediate segment of the current capacitance curve, and a meter for measuring fluctuations in capacitance within said segment caused by variations in the moisture content of the material as it passes between the plates.

27. Apparatus for measuring the moisture content of fluent material in motion comprising a radio frequency system, a condenser in said system comprising a pair of spaced plates, a relatively narrow chute placed across the fluent material to separate therefrom a stream which constitutes a true cross section of the material, means passing said stream of material in constant volume and at a constant pressure head between said plates, and a meter connected with said system for measuring fluctuations in capacitance caused by variations in the moisture content of the material passing between the plates.

CHARLES E. ROGERS.

References Cited in the file of this patent

UNITED STATES PATENTS

| Number | Name | Date |
|---|---|---|
| 1,789,451 | Roasire et al. | Jan. 20, 1931 |
| 1,822,604 | Simons et al. | Sept. 8, 1931 |
| 1,824,745 | Allen | Sept. 22, 1931 |
| 1,826,247 | Heppenstall | Oct. 6, 1931 |
| 1,895,118 | Allen | Jan. 24, 1933 |
| 2,043,241 | Eyer | June 9, 1936 |
| 2,071,607 | Bjorndal | Feb. 23, 1937 |
| 2,200,863 | Schuck | May 14, 1940 |
| 2,222,221 | Burford | Nov. 19, 1940 |
| 2,297,346 | Crist | Sept. 29, 1942 |
| 2,373,846 | Olken | Apr. 17, 1945 |
| 2,518,045 | May | Aug. 8, 1950 |
| 2,519,089 | Whitaker | Aug. 15, 1950 |
| 2,542,928 | Kimball et al. | Feb. 20, 1951 |
| 2,588,882 | Rolfson | Mar. 11, 1952 |
| 2,599,583 | Robinson et al. | June 10, 1952 |
| 2,607,830 | Razek | Aug. 19, 1952 |

FOREIGN PATENTS

| Number | Country | Date |
|---|---|---|
| 597,800 | Great Britain | Feb. 3, 1940 |